Sept. 24, 1974  D. M. GLUNTZ ET AL  3,838,002
JET PUMP FOR NUCLEAR REACTOR
Filed July 21, 1972  6 Sheets-Sheet 1

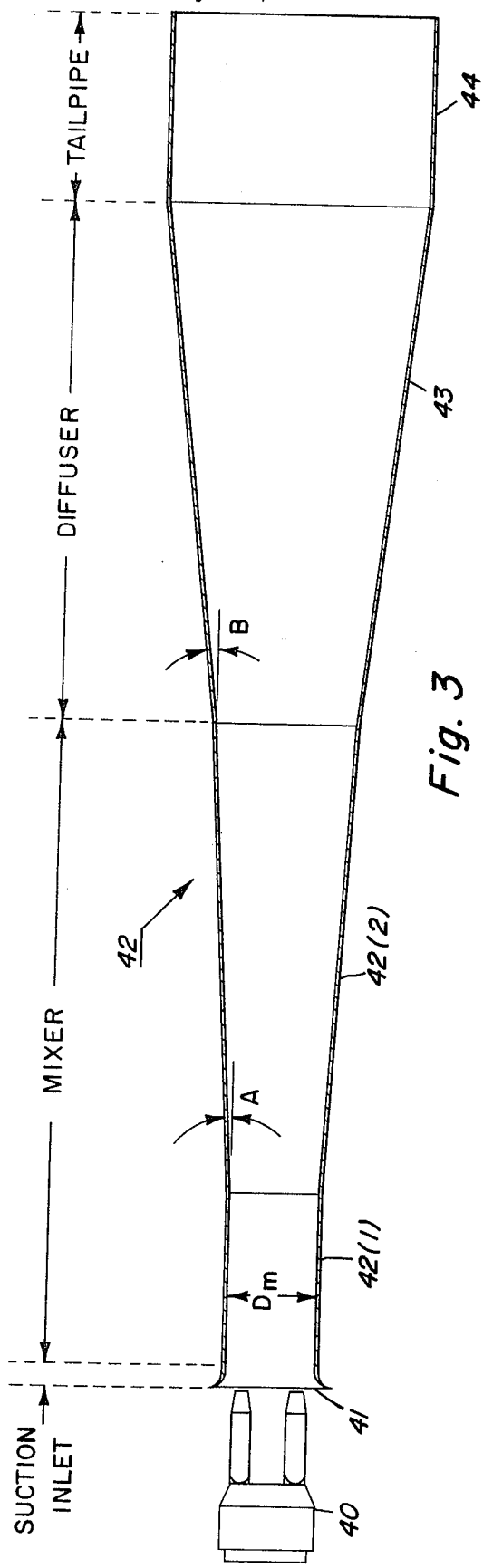
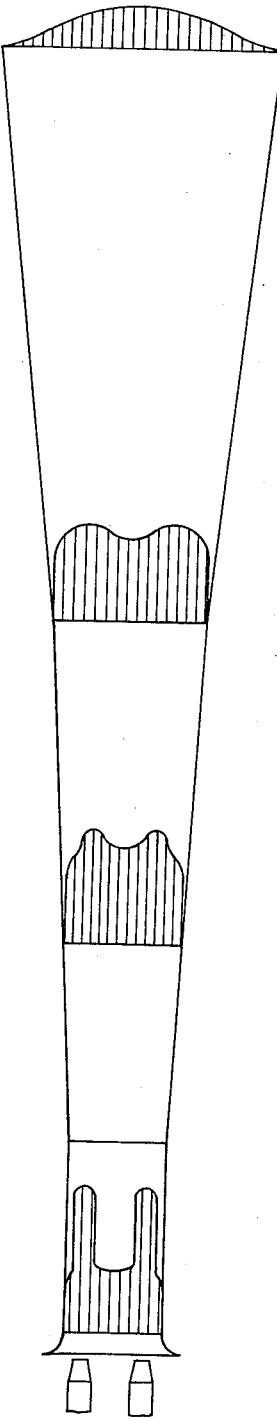

Sept. 24, 1974 3,838,002

JET PUMP FOR NUCLEAR REACTOR

Filed July 21, 1972 6 Sheets-Sheet 5

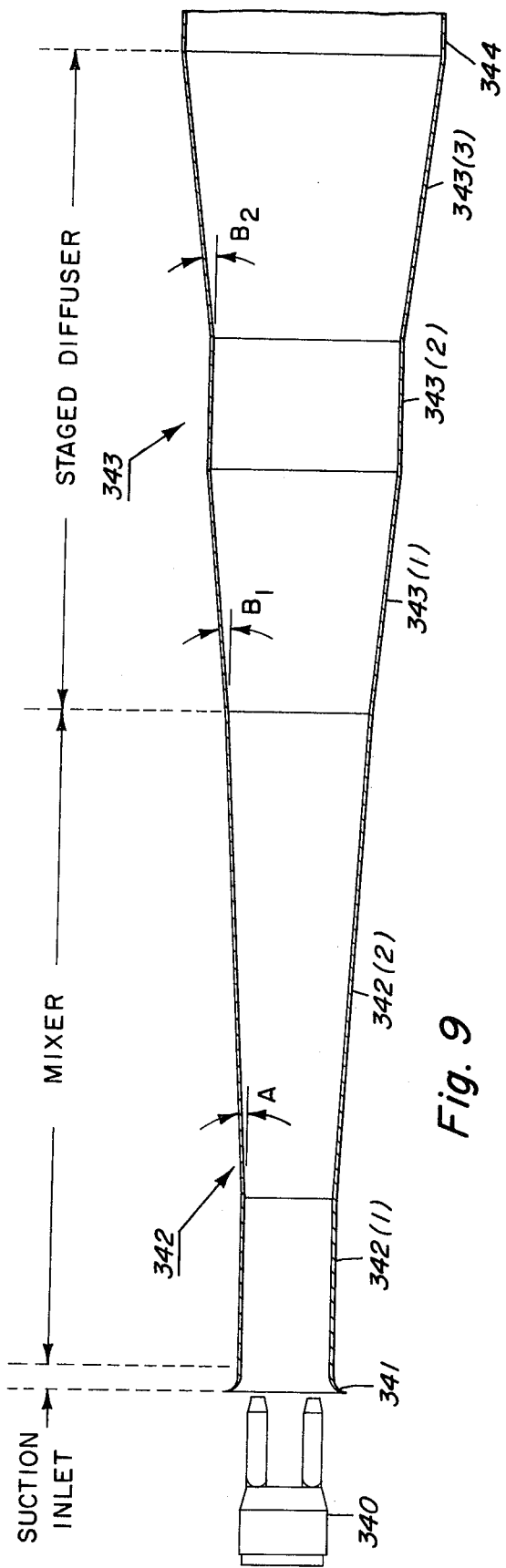
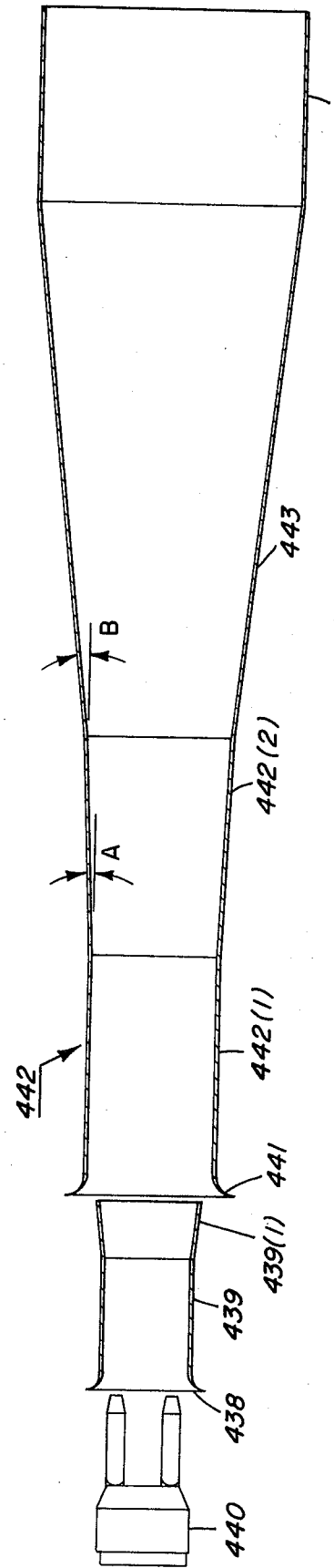

United States Patent Office 3,838,002
Patented Sept. 24, 1974

3,838,002
JET PUMP FOR NUCLEAR REACTOR
Douglas M. Gluntz, Campbell, George W. Fitzsimmons, Jr., San Jose, Siegbert Wolf, Sunnyvale, and Alvydas A. Kudirka, San Jose, Calif., assignors to General Electric Company
Filed July 21, 1972, Ser. No. 274,061
Int. Cl. F04f 5/46; G21c 15/24; G21d 1/04
U.S. Cl. 176—65                                    13 Claims

ABSTRACT OF THE DISCLOSURE

A jet pump coolant circulation system for a nuclear reactor wherein the combination of multiple nozzles and a divergent mixer section provide increased efficiency in jet pumps of given length.

BACKGROUND

It is known to use a system of jet pumps for circulating a cooling fluid, such as water, through the fuel core of a nuclear reactor contained within a pressure vessel. Such a system is shown, for example, by J. M. Roberts in U.S. Pat. No. 3,378,456 and by D. M. Gluntz in U.S. Pat. No. 3,625,820. In such a system the jet pumps are located in a downcomer annulus between the pressure vessel and a shroud surrounding the core whereby the jet pumps pressurize a coolant plenum beneath the core.

Among the advantages of jet pumps for such an application is the reduction in the number and size of the pipe loops which are external to the pressure vessel. Other advantages include the lack of moving mechanical parts within the pressure vessel and the limited flow area of the jet pump throats which act as restrictors in the coolant circulation path to limit rate of loss of coolant in the unlikely event of a break in the system.

A disadvantage of jet pumps is their relatively low efficiency. In a nuclear water-cooled power reactor of current design in the order of 250,000 gallons of water per minute is pumped through the core. The power required to provide this coolant circulation is in the order of one percent of the gross power produced by the reactor core. It is, therefore, clear that jet pump efficiency is an important factor in the overall efficiency of the power plant and that each percentage point of improvement of jet pump efficiency can be of substantial economic value.

A consideration in the design of jet pumps for use in a nuclear reactor is that the pressure vessel is a costly structure and space therein for the jet pumps is limited. In particular the length of the jet pumps is limited for practical reasons to the below-water-level height in the downcomer annulus surrounding the core. It is therefore an object of the invention to provide a jet pump of increased efficiency for a given overall jet pump length.

A jet pump utilizes a stream of driving or motive fluid of high velocity to drive a stream of driven or suction fluid by means of momentum exchange between the two streams. A known jet pump configuration for use with incompressible fluids includes a highly convergent suction inlet section, submersed in the driven fluid. A nozzle is positioned adjacent the suction inlet section, the nozzle receiving high-pressure driving fluid and directing a high-velocity stream of driving fluid into the suction inlet section by which driven fluid is entrained and driven into an elongated throat or mixer section where momentum is exchanged between the driving and driven fluids. The resulting flow exiting the mixer section enters a divergent diffuser section wherein flow velocity decreases and pressure increases. Finally the flow enters a recovery section or tailpipe. Significant factors affecting the efficiency of jet pumps are the fluid friction within the pump, the effectiveness of momentum exchange between the driving and driven fluids and the effectiveness of pressure recovery in the diffuser section.

The use of a plurality of nozzles, rather than a single nozzle, can, in theory, provide more rapid mixing of the driving and driven fluids within a given length and, hence, effective mixing can be accomplished in a mixing section of shorter length. The use of such multiple nozzles is known, particularly for use with compressible fluids, as shown, for example, in U.S. Pat. Nos. 1,543,834 and 2,074,480. However, prior multiple nozzle configurations have not provided the promised increased overall efficiency, in incompressible fluid applications, probably because of undue losses in the nozzle arrangement.

In the mixing section of the jet pump the driving stream gradually widens until it touches the mixing section walls. When multiple jets are used, this occurs in a shorter length of the mixing section. It has been common practice in prior jet pumps, particularly those for use with incompressible fluids, to provide a mixer section of constant cross section area. For such a mixer section configuration it is found that the length required for sufficiently complete mixing is undesirably long. Furthermore, in a constant throat mixer configuration the mixer wall friction, particularly after the driving stream touches the wall, is undesirably high. This condition can be aggravated in jet pumps of improper design by the higher mixing rate provided by multiple nozzles. Thus a more specific object is to provide an improved combination of multiple nozzles and mixer sections in jet pumps.

SUMMARY

These and other objects are achieved in accordance with the invention by a jet pump having multiple nozzles with contoured or tapered inlet and outlet structures for decreased nozzle losses in combination with a mixer which is divergent over at least a part of its length to decrease friction losses therein and to improve mixing in a mixer section of relatively short length. The combination of the multiple nozzles and a relatively short mixer section permits the use of a longer, more efficient diffuser section in a jet pump of given length.

DRAWING

The invention is described more specifically hereinafter with reference to the accompanying drawing wherein:

FIG. 3 is a longitudinal cross section view of an embodiment of a jet pump according to the invention;

FIG. 6 is an illustration of velocity profiles at various points in a jet pump; and FIGS. 7–10 illustrate alternate embodiments of jet pumps according to the invention.

Figure 1:
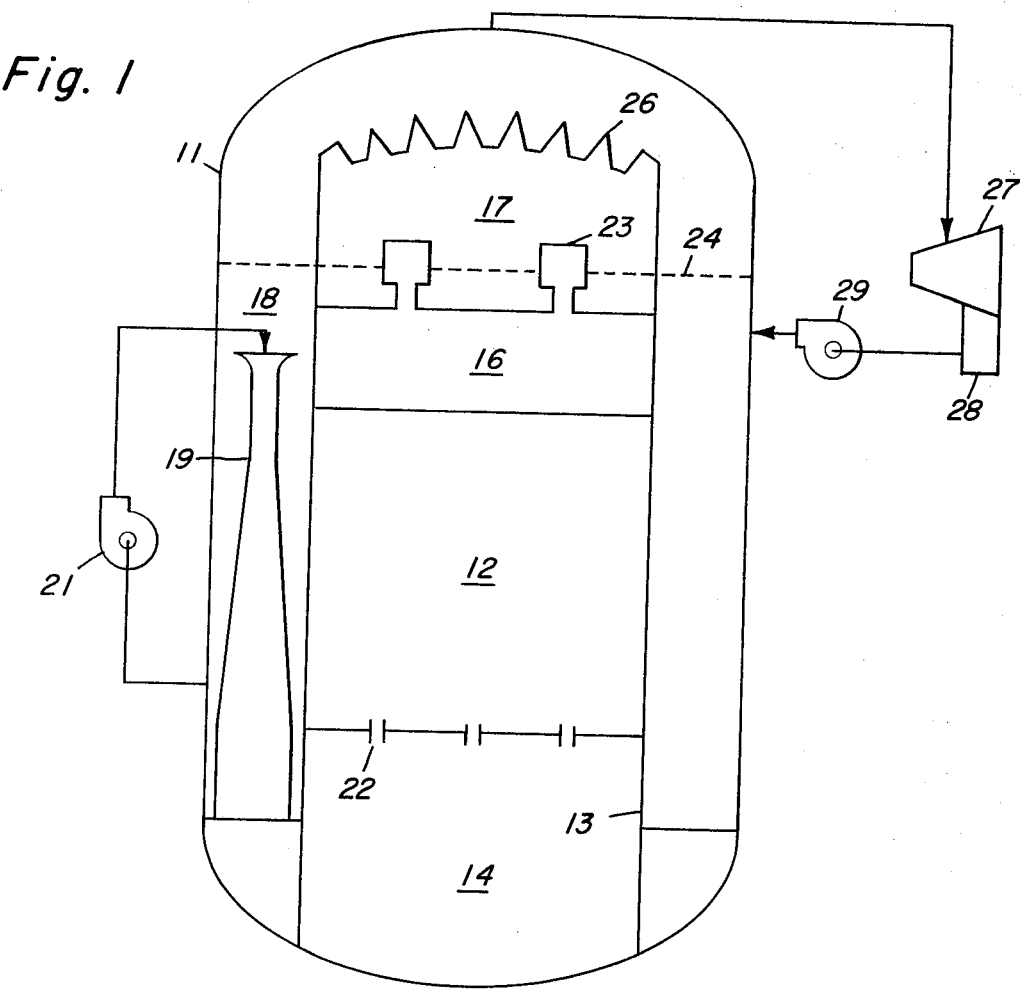
FIG. 1 is a schematic illustration of a boiling water nuclear reactor system employing jet pumps for coolant circulation.

Shown schematically in FIG. 1 is an example of a nuclear reactor system of the boiling water, direct cycle type. The system includes a pressure vessel 11 containing a nuclear fuel core 12. The core is surrounded by a shroud 13 which forms a water inlet plenum 14 beneath the core, a steam-water mixture chamber 16 above the core, a steam chamber 17 above the mixture chamber 16 and a downcomer annulus 18 between the shroud 13 and the pressure vessel walls.

Water under pressure is supplied to the inlet plenum 14 by a plurality of jet pumps 19 mounted in the annulus 18 and receiving driving water from a pump 21. The water from plenum 14 flows upward through orifices 22 and past the nuclear fuel of the core 12 whereby a portion of the water is converted to steam. The resulting steam-water mixture in chamber 16 flows into a plurality of gas-liquid separating units 23 whereby the steam is discharged into chamber 17 and the separated water is returned to the water pool, the water level of which is indicated by the dashed line 24. The steam passes from chamber 17 through a dryer arrangement 26, which extracts residual moisture, and is taken from the pressure vessel to a utilization device such as a steam turbine 27. The turbine exhaust is condensed in a condenser 28 and returned to the pressure vessel by a pump 29.

Figure 2A:
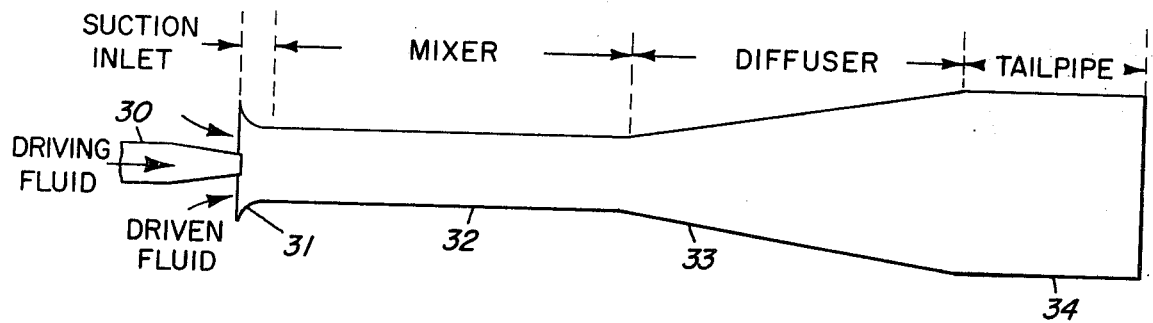
FIGS. 2A, 2B and 2C are schematic views of prior art jet pump configurations.

A well-known jet pump configuration used for incompressible fluids is shown schematically in FIG. 2A. Such a jet pump comprises a nozzle 30 for receiving a driving fluid, a highly convergent suction inlet 31 for receiving a driven fluid, a cylindrical (constant cross section area) mixer section 32, a diverging diffuser section 33 and a cylindrical tailpipe or recovery section 34. An advanced embodiment of such a jet pump is shown and described in detail in U.S. Pat. No. 3,625,820.

In the continuing quest for greater efficiency, the use of shaped mixer passages to improve jet pump performance beyond that attainable from the constant area mixer passage of FIG. 2A has been investigated both analytically and experimentally. For applications involving compressible fluids, a shaped configuration, as shown schematically in FIG. 2B, has been commercially successful. In this configuration the cylindrical mixer sections is replaced by an extended suction inlet or converging throat section 36 followed by a diverging diffuser section 37. A nozzle having a diverging tip 38 is usually employed. A somewhat similar configuration utilizing a plurality of nozzles is shown in U.S. Pat. No. 2,074,480.

Figure 2B:
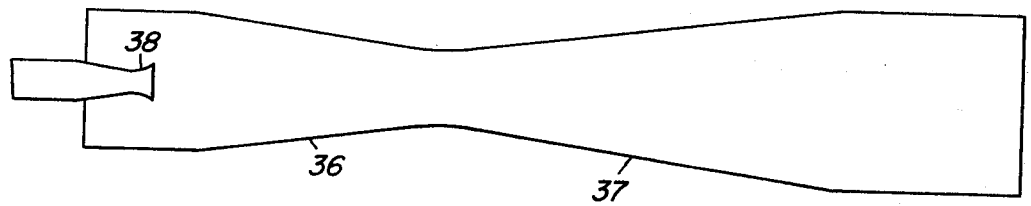
Figure 2C:
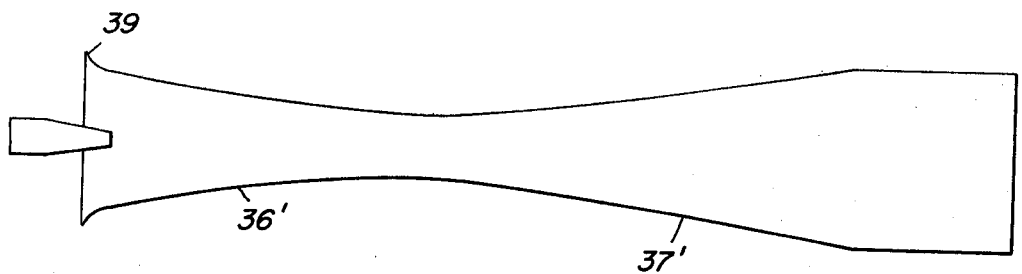

An adaptation of the configuration of FIG. 2B for use with incompressible fluids is illustrated schematically in FIG. 2C and includes a sharply converging inlet 39, an extended converging throat section 36' and a divergent diffuser section 37'. Jet pumps of this general configuration have been described by A. J. Stepanoff in "Centrifugal and Axial Flow Pumps," 2nd edition, John Wiley & Sons, Inc., 1957, chapter 18. Convergent-divergent throat configurations are also shown in U.S. Pat. 3,371,618. Expectations that such convergent-divergent configurations would provide increased efficiency in incompressible fluid applications have not materialized in practice.

Contrary to the prior art direction of jet pump development, the present invention utilizes an effective multiple nozzle arrangement in combination with a mixer section which is divergent over at least a substantial portion of its length.

The general configuration of the jet pump of the invention is illustrated in longitudinal cross section view in FIG. 3. As shown therein the jet pump includes a multiple nozzle arrangement 40, a suction inlet section 41, a mixer section 42 including a cylindrical portion 42(1) and a conical divergent portion 42(2), a divergent diffuser section 43, and a tailpipe 44.

Figure 4A:
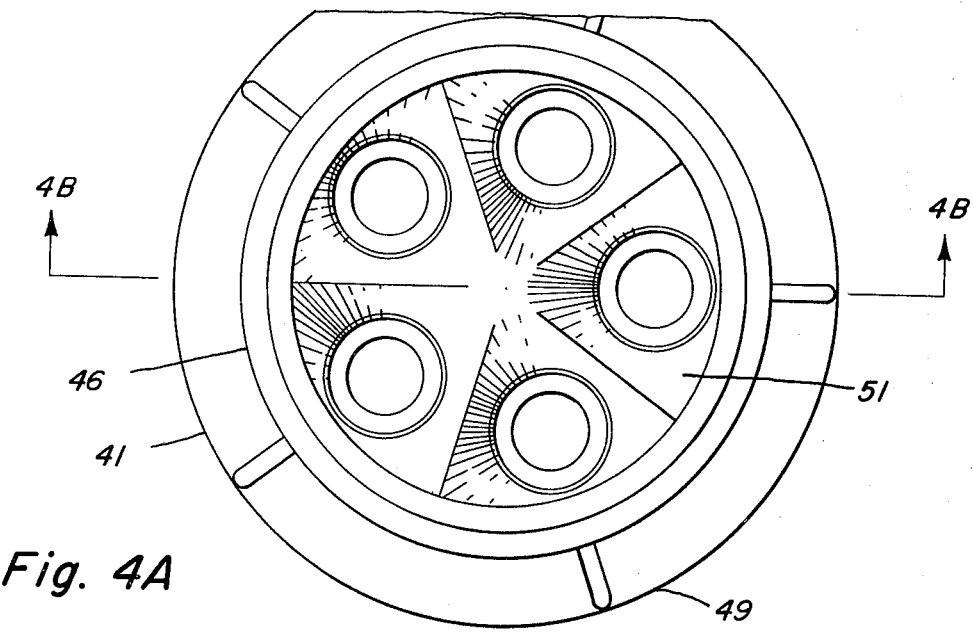
FIGS. 4A and 4B are plan and elevation views of a multiple nozzle structure of the invention.
Figure 4B:
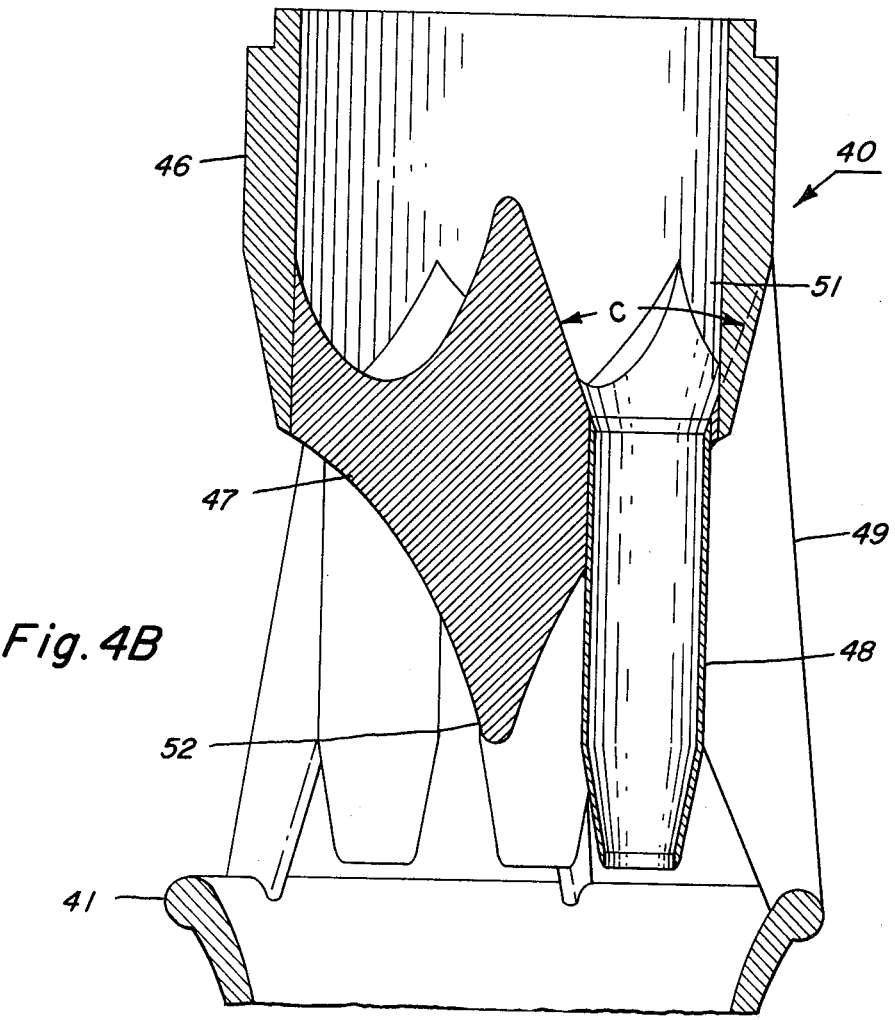

The nozzle arrangement 40 of the invention is shown in deail in FIGS. 4A and 4B. It includes a cylindrical feed pipe 46 for receiving drive fluid, a nozzle support piece 47 fixed in the pipe 46 for supporting a plurality of nozzles 48 and a plurality of support members 49 connected between the feed pipe 46 and the lip of the suction inlet section 41 by which the nozzle arrangement 40 is held in concentric position.

The potential for improvement in efficiency of jet pumps by the use of multiple nozzles has been recognized. The multiple nozzles provide more surface area for mixing the driving and driven fluid streams than does a single nozzle of the same cross sectional area by which the mixing can be accomplished in a mixer section of shorter length with a consequent reduction in friction losses. However, prior multiple nozzle arrangements in general failed to provide the promised improvement presumably because of increased losses in the prior multiple nozzle arrangements.

In accordance with the present invention the potential of the multiple nozzle arrangement is realized by providing more effective fluid flow channels in the nozzle arrangement. This is accomplished in several ways. The inlets to each of the nozzles 48 are contoured to provide smooth fluid flow into the nozzles. As shown in FIGS. 4A and 4B, the nozzle support piece 47 is machined around the axis of each nozzle at an angle C (for example forty degrees) to provide a convergent conical inlet 51 to each nozzle. Shapes other than conical (for example elliptical) could be used. However, the conical shape is easy to machine and it has proven effective.

On its outlet side the nozzle support piece 47 is contoured with a generally concave elliptical shape to form a streamlined central fairing 52 and the support members 49 are streamlined in cross section to provide smooth flow of the driven fluid into the suction inlet 41.

The suction inlet 41 is preferably elliptical in its convergent shape (as explained in aforementioned Pat. No. 3,625,820) with a longitudinal length equal to between about one-half to one times the minimum diameter $D_m$ of the mixer section 42.

Referring again to FIG. 3, the high pressure streams of driving fluid from the nozzle arrangement 41 entrains the surrounding driven fluid in the suction inlet section 41 and the combined flow is driven into the mixer section 42. As momentum exchange between the driving and driven streams proceeds the jet of driving fluid mixes with the driven fluid and gradually widens until it touches the mixer walls (assuming a sufficient mixer length). For water jet pumps of the type described the jet expansion-entrainment rates produce jet expansion half-angles in the order of 2½ degrees or less. As described in U.S. Pat. 3,565,820, in prior jet pumps with constant area cylindrical mixer sections, the length of the mixer is selected so that the widening jet touches the wall near the end of the mixer section to provide substantially complete mixing with minimum friction losses in the mixer section.

Figure 5:
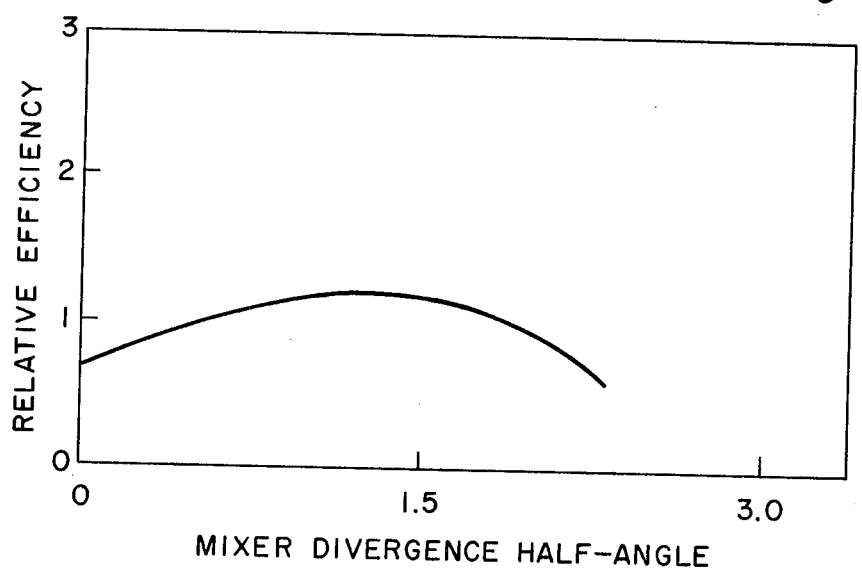
FIG. 5 is a severe illustrating jet pump efficiency versus mixer divergence angle.

In accordance with the present invention the mixer section 42 is formed with a divergent portion 42(2) over a substantial part of the mixer length (for example, over one-half to two-thirds of the mixer section length). It has been discovered that the use of this divergent mixer portion provides substantially complete mixing in a mixer section of shorter length. In general the mixer divergence half-angle A should be less than the half-angle of the jet expansion within the mixer, for example, in the order of 1½ degrees. FIG. 5 shows a curve of relative jet pump efficiency as a function of mixer divergence half-angle A for a given jet pump.

FIG. 6 illustrates the velocity profiles of the fluid at various points in the jet pump. At the end of the mixer section the velocity profile is substantially flat (that is, perpendicular to the longitudinal axis) except for the boundary layer between the fluid stream and the pump walls. Within the divergent diffuser section 43 the high speed of the fluid is reduced and the static pressure of the fluid is increased. The preferred divergence half-angle B is about the same as the jet expansion half-angle, for example, in the order of 2½ degrees.

Figure 7:
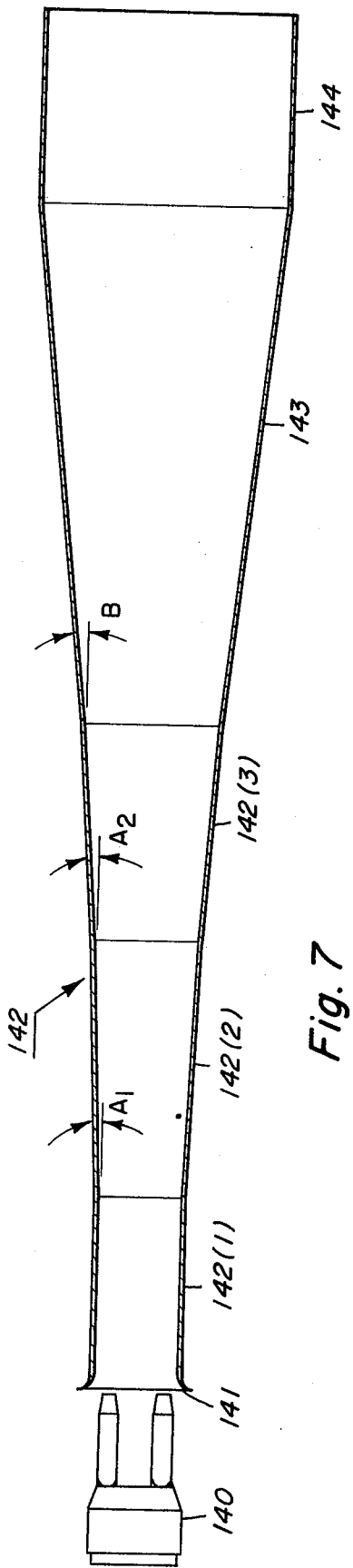

Further embodiments of the invention are illustrated in FIGS. 7–10. Illustrated in FIG. 7 is a jet pump configuration including a mixer section 142, a diffuser section 143 and a tailpipe 144. The mixer section 142 is formed of a cylindrical portion 142(1) and a two-step divergent portion including serially connected divergent portions 142(2) and 142(3). For example, each portion 142(1), 142(2) and 142(3) may be in the order of one-third the total length of the mixer portion 142 and the half-angle of divergence, angle $A_1$, of the first divergent portion 142(1) may be about one-half the half-angle of divergence angle $A_2$, of the second divergent portion 142(2), the angle $A_2$ being less than the half-angle of jet expansion and less than the divergence angle B of the diffuser 143. The plural divergent mixer portions of this embodiment enhances efficiency for the reason that this configuration more closely approximates the jet expansion-entrainment rate along the mixer section. While only two steps of mixer divergence are illustrated, the number of steps is limited only by practical fabrication limitations.

Figure 8:
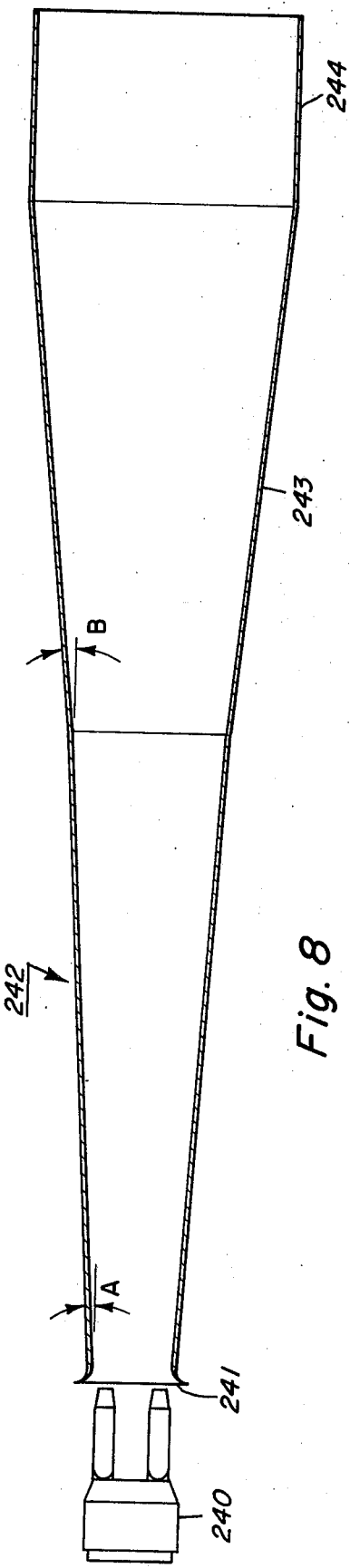

Illustrated in FIG. 8 is a jet pump configuration including a mixer section 242, a diffuser section 243 and a tailpipe 244. In this embodiment the mixer section 242 is divergent along substantially its entire length, from its junction with suction inlet 241 to its junction with diffuser section 243, at a half-angle of divergence A which is less than the half-angle of jet expansion and less than the divergence half-angle B of the diffuser section 243. This divergent mixer configuration, free of a constant area portion, is useful with multiple nozzle arrangements which provide high jet expansion-entrainment rates.

In FIG. 9 the combination of a multiple nozzle 340 and a mixer section 342 with a divergent portion 342(2), similar to that shown in FIG. 3, is illustrated in a jet pump incorporating a multiple stage diffuser section 343 including a first divergent portion 343(1), a second divergent portion 343(3) and an intermediate cylindrical portion 343(2). The half-angles of divergence $B_1$ and $B_2$ may be about equal, for example, about 2½ degrees. Such multistage diffuser arrangements are capable of improved momentum conversion efficiency as described in greater detail in U.S. Pat. No. 3,494,296. The shorter length required of the divergent mixer section of the invention allows the use of such longer, more efficient diffuser sections in a jet pump of given length.

As illustrated in FIG. 10, the present invention is utilized in a multiple stage jet pump configuration comprising a first stage which includes a multiple drive nozzle arrangement 440, a suction inlet 438 and a mixer section 439 having a divergent driving end 439(1), with a half-angle of divergence of from about 1.5–3 degrees, and a second stage which includes a suction inlet 441, a mixer section 442 with a cylindrical portion 442(1) and a divergent portion 442(2), a divergent diffuser section 443 and a tailpipe 444. As shown in FIG. 10, the length of the divergent portion 442(2) is about one-half the total length of the mixer section 422. Alternatively, the previously described mixer sections 42, 142 or 242, of FIGS. 3, 7 and 8, may be used herein. Similarly, a multistage diffuser, such as shown in FIG. 9 may replace the single stage diffuser 443 in the multistage jet pump of FIG. 10.

In a specific example of a jet pump according to the invention, having a configuration as shown in FIG. 3, the nozzle arrangement 40 consists of five nozzles 48 equally spaced with their axes on a circle of about 4.5 inches in diameter and with inlets 51 tapered with an angle C of about forty degrees. The suction inlet 41 has a convergent elliptical shape and a length of about 3 inches. The mixer section 42 includes a cylindrical portion 42(1) of about 25 inches in length with an inside diameter Dm of about 7 inches and a divergent portion 42(2) about 41 inches in length with a divergence angle A of about 1½ degrees. The diffuser 43 has a length of about 90 inches with a divergence angle B of about 2½ degrees. This jet pump was found to provide an increase in efficiency of at least five percentage points over prior jet pumps of similar size.

Thus what has been described is a jet pump arrangement including the combination of a multiple nozzle and a mixer section having a divergent portion by which mixing in a shorter length is accomplished and, therefore, with reduced friction losses for greater efficiency. The shorter mixer length also allows the use of a longer more efficient diffuser section in a jet pump of given length.

What is claimed is:

1. In a nuclear reactor having a water cooled nuclear chain reacting core, a jet pump for circulating water through said core comprising: an elongated body portion having a longitudinal axis and including in series a convergent suction inlet section for receiving driving and driven water, a mixer section for momentum exchange between said driving and driven water and a divergent diffuser section for pressure recovery, said mixer section including a cylindrical first portion and a divergent second portion, said second portion comprising at least one-half but less than two-thirds of a total length of said mixer section, said second portion being divergent with an angle of divergence A and said diffuser section having an angle of divergence B where angle B is greater than angle A; and a nozzle arrangement adjacent said inlet section including a plurality of nozzles for receiving driving water and for directing said driving water into said suction inlet section, said nozzles being arranged in a circle around said longitudinal axis of said body portion and each said nozzle having a longitudinal axis parallel to said longitudinal axis of said body portion, a separate convergent inlet for each of said nozzles and a streamlined central fairing of generally conical shape between said nozzles adjacent said suction inlet section.

2. The jet pump of claim 1 including a feed pipe for receiving said driving water for said nozzles, a nozzle support piece in one end of said feed pipe for supporting said nozzles in spaced circular arrangement, said tapered convergent inlets being formed in said support piece, said support piece also forming said streamlined central fairing between said nozzles.

3. The jet pump of claim 2 including a plurality of streamlined support members between said feed pipe and said suction inlet section.

4. The jet pump of claim 1 wherein said angle A, measured from said longitudinal axis of said body portion, is between about 1 to 2 degrees.

5. The jet pump of claim 4 wherein said angle B, measured from said longitudinal axis of said body portion, is about 2½ degrees.

6. The jet pump of claim 1 wherein said angle A is between about one-quarter to about one-half an angle of jet expansion formed by said driving water from said nozzles in said jet pump.

7. The jet pump of claim 1 wherein said angle B is about equal to an angle of jet expansion formed by said driving water from said nozzles in said jet pump.

8. The jet pump of claim 1 wherein said mixer section is formed with a first divergent portion having an angle of divergence $A_1$ and a second divergent portion having an angle of divergence $A_2$ where angle $A_2$ is greater than angle $A_1$ and less than angle B.

9. The jet pump of claim 1 wherein said mixer section is divergent substantially throughout its entire length from said suction inlet section to said diffuser section.

10. The jet pump of claim 1 wherein said diffuser section is formed of a divergent first portion, a cylindrical second portion and a divergent third portion.

11. The jet pump of claim 1 including a cyclindical tailpipe connected to said diffuser section.

12. The jet pump of claim 1 including an intermediate stage between said nozzle arrangement and said suction inlet section, said intermediate stage including a convergent inlet adjacent said nozzle arrangement, a cylindrical intermediate section and a divergent driving end adjacent said suction inlet section.

13. The jet pump of claim 12 wherein said divergent driving end has a half-angle of divergence of between about 1.5 to 3 degrees.

References Cited

UNITED STATES PATENTS

| | | | |
|---|---|---|---|
| 3,494,296 | 2/1970 | Gluntz | 417—196 |
| 3,545,886 | 12/1970 | Chalom | 417—196 |
| 3,625,820 | 12/1971 | Gluntz | 176—54 |
| 3,525,474 | 8/1970 | Von Ohain et al. | 417—163 |
| 3,659,962 | 5/1972 | Zink et al. | 417—198 |
| 46,308 | 1865 | Prusmann | 417—196 |
| 2,146,100 | 2/1939 | Walch | 417—151 |
| 3,018,799 | 1/1962 | Volkmann | 417—151 |
| 2,077,029 | 4/1937 | Baschant | 417—174 |
| 1,002,753 | 9/1911 | Rees | 417—179 |
| 2,074,480 | 3/1937 | Mac Lean | 417—196 |

OTHER REFERENCES

Schutle & Koerting Co., *Water Jet Exhausters and Compressors*, July 1938, pp. 4401 and 5514.

CARL D. QUARFORTH, Primary Examiner

R. S. GAITHER, Assistant Examiner

U.S. Cl. X.R.

176—54, 56, 61; 417—151, 174, 179, 196, 198

UNITED STATES PATENT OFFICE
CERTIFICATE OF CORRECTION

Patent No. 3,838,002      Dated 24 September 1974

Inventor(s) Douglas M. Gluntz et al

It is certified that error appears in the above-identified patent and that said Letters Patent are hereby corrected as shown below:

Column 2, line 59, "severe" should be --curve--. Column 3, line 68, "deail" should be --detail--. Column 5, line 53, "422" should be --442--. Column 6, line 34, delete the period after "nozzles" and insert a comma; line 45, after "to" insert --about--; line 67, "cyclindical" should be --cylindrical--.

Signed and sealed this 3rd day of December 1974.

(SEAL)
Attest:

McCOY M. GIBSON JR.
Attesting Officer

C. MARSHALL DANN
Commissioner of Patents